(12) United States Patent
Janik et al.

(10) Patent No.: US 6,500,335 B2
(45) Date of Patent: Dec. 31, 2002

(54) FILTER SYSTEM BASE MODULE WITH SELF-LOCKING CARTRIDGE RETAINER

(75) Inventors: Leon P. Janik, Suffield, CT (US); Michael J. Williams, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 26 days.

(21) Appl. No.: 09/785,675

(22) Filed: Feb. 16, 2001

(65) Prior Publication Data

US 2001/0045385 A1 Nov. 29, 2001

Related U.S. Application Data (60) Provisional application No. 60/182,956, filed on Feb. 16, 2000.

(51) Int. Cl.[7] .......................... B01D 35/30; B01D 27/08
(52) U.S. Cl. ...................... 210/232; 210/249; 210/444
(58) Field of Search ................................ 210/232, 249, 210/444

(56) References Cited

U.S. PATENT DOCUMENTS

| | | | |
|---|---|---|---|
| 4,305,180 A | * | 12/1981 | Schwartz |
| 4,689,147 A | * | 8/1987 | Leoncavallo et al. |
| 4,719,012 A | * | 1/1988 | Groezinger et al. |
| 4,806,240 A | * | 2/1989 | Giordano et al. |
| 4,915,831 A | * | 4/1990 | Taylor |
| 5,209,845 A | * | 5/1993 | Sims |
| 5,302,284 A | | 4/1994 | Zeiner et al. ................ 210/232 |
| 5,336,406 A | * | 8/1994 | Stanford et al. |
| 5,772,881 A | * | 6/1998 | Stockhowe et al. |
| 5,826,854 A | * | 10/1998 | Janvrin et al. |
| 5,876,600 A | * | 3/1999 | Matsubara et al. |
| 6,001,249 A | * | 12/1999 | Bailey et al. |
| 6,120,685 A | * | 9/2000 | Carlson et al. |
| 6,187,188 B1 | * | 2/2001 | Janik et al. |

FOREIGN PATENT DOCUMENTS

| | | |
|---|---|---|
| EP | 0 783 913 A1 | 7/1997 |
| EP | 0 830 885 A1 | 3/1998 |
| EP | 1 070 530 A1 | 1/2001 |
| GB | 2 333 246 A | 7/1999 |
| JP | 9-173717 | * 7/1997 |
| WO | WO 98/40147 | 9/1998 |

OTHER PUBLICATIONS

European Search Report for European Application No. 01301354.5–2311–dated Mar. 18, 2002.

* cited by examiner

Primary Examiner—Thomas M. Lithgow
(74) Attorney, Agent, or Firm—Alix, Yale & Ristas, LLP (57) ABSTRACT

A molded base module for a filter assembly includes a header portion that defines a receiving cavity for a replaceable cartridge and may include integral inlet and outlet structures for communicating with the received filtered cartridge. The header portion includes an integrally formed retainer having a retaining channel for receiving tabs projecting from the cartridge, thereby retaining the cartridge to the module. The retaining channel is defined by a retaining lip and axially spaced shoulder connected by a side wall. In an illustrated embodiment, the retaining lip includes a plurality of angularly spaced axial slots and the side wall includes ramp-like projections which mate with correspondingly shaped tabs projecting from the cartridge.

17 Claims, 9 Drawing Sheets

FILTER SYSTEM BASE MODULE WITH SELF-LOCKING CARTRIDGE RETAINER

REFERENCE TO RELATED APPLICATIONS

This application claims the benefit of U.S. Provisional Application No. 60/182,956, filed Feb. 16, 2000.

BACKGROUND OF THE INVENTION

This invention relates generally to fuel filter systems for internal combustion engines. More particularly, this invention relates to a base assembly for a fuel filter system which employs a replaceable cartridge mountable to the base.

In fuel filter systems to which the invention relates, such as disclosed in U.S. Pat. Nos. 5,203,994, 5,302,284 and 5,766,463, a disposable filter cartridge is mounted to a base in such a way that it can be relatively easily removed at pre-established intervals for replacement purposes. The base typically has a pair of coaxial central conduits which provide the fuel inlet and outlet to the filter cartridge. The cartridge may contain a single or multiple stage filter configuration for filtering the fuel. In numerous embodiments the replaceable filter cartridge is suspended below the base, but other orientations are commonly employed. The base is mounted to the vehicle in any of a number of locations depending on the particular application and spacial constraints. The base typically also includes inlet and outlet connectors which may be in the form of posts or other structures which mount fittings and connect with the input and output lines to the base.

In one well known conventional construction, a retainer ring is threaded to the base and engages a circumferential roll seam shoulder of the filter cartridge to retain the cartridge to the base. The retainer ring may alternately include a ramp-like structure which mates with a complementary ramp of the base and the cartridge and/or retainer ring is spring-loaded to facilitate retention of the cartridge to the base. The cartridge typically includes sealing grommets or other sealing structures to seal the cartridge with the inlet and outlet conduits of the base. It should be appreciated that the base structures for replaceable filter cartridges may assume a wide variety of configurations and spacial orientations.

SUMMARY OF THE INVENTION

Briefly stated, the invention in a preferred form is a novel base module for a filter assembly, such as a fuel filter assembly. The base module may be a molded member that may, for example, be formed from plastic, glass-filled nylon or other similar materials. The module comprises a header portion having a central axis and defining a generally cylindrical receiving cavity symmetrical about the axis. A retainer integrally extends from the header portion and includes an inward retaining channel generally coaxial with the axis.

The retaining channel is defined by a shoulder, side wall and retaining lip. The retaining lip is adjacent the open end of the receiving cavity and includes a plurality of angularly spaced axial slots. The axial slots are configured to receive tabs that radially extend from the peripheral roll seam of a filter cartridge. The shoulder, side wall and retainer lip provide a retaining structure wherein a cartridge is mountable to the base module by axially inserting the tabs through the axial slots and rotating the cartridge. The retaining structure and tabs are configured to provide enhanced frictional engagement between the tabs and the retaining channel.

In a particular aspect of the invention, the side wall has a plurality of ramp-like projections extending radially inward from a position adjacent one of the axial slots. As the cartridge and its associated tabs are rotated in the retaining structure, the ramp-like projections engage the radially outer surface of the tabs. The retainer lip may include a plurality of inclined portions extending from each axial slot to a pinch crest. The inclined portions engage the underside of each tab during rotation of the cartridge and force the cartridge axially into the receiving cavity. The pinch crests frictionally engage the tabs against the axially opposed shoulder.

In an alternative embodiment, the retaining structure may include a stamped metal split ring that is held in a generally fixed rotational and axial relationship within the retaining channel, essentially replacing the retainer lip. The split ring may define the axial slots and include a bump or detent associated with each axial slot. The tabs of a received cartridge pass through the axial slots and over the bumps upon rotation. The bumps provide enhanced frictional engagement between the tabs and the split ring to prevent the tabs from easily reversing direction and unintentionally falling out of the axial slots.

In another aspect, the header portion of the base module provides inlet and outlet conduits extending axially into the receiving cavity and associated inlet and outlet connectors in communication with the respective conduits. A bracket may integrally extend from the header portion for mounting the base module to a mounting structure of the vehicle. The bracket preferably includes at least one opening for receiving a mounting fastener. In one described embodiment, the first and second conduits are coaxial, and the connectors extend generally axially.

In a further aspect, a disposable filter cartridge having radially protruding retention tabs may be received in the receiving cavity wherein the tabs are captured in the retaining channel. The tabs preferably complement the ramp-like projections of the retainer.

An object of the invention is to provide a new and improved base module for a fuel filter system.

Another object of the invention is to provide a new and improved base module adapted for securely receiving a filter cartridge and having an efficient and low cost construction.

A further object of the invention is to provide a new and improved base module that has a substantially molded construction.

A yet further object of the invention is to provide a filter cartridge and base module assembly in which the cartridge can be installed and securely retained without the use of tools or separate retaining parts.

Other objects and advantages of the invention will become apparent from the specification and the drawings.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

With reference to the drawings wherein like numerals represent like parts throughout the figures, a base module or header for a fuel filter system is generally designated by the numeral 10. The module 10 is preferably employed for receiving a disposable filter cartridge such as cartridge 12 (FIGS. 3, 6 and 7) wherein the cartridge may be replaced as required. The module mounts to the vehicle at a location specified by the vehicle manufacturer and provides a junction for receiving the fuel to be filtered and for transmitting the filtered fuel to the fuel supply system, the fuel injection pump and/or the internal combustion engine (none illustrated).

Although numerous applications are possible, the fuel filter assembly is especially adapted for incorporation into the fuel supply system of an internal combustion engine (not illustrated), such as a diesel engine, for removing particulate matter and/or separating water from the fuel. For the illustrated embodiment, the disposable filter cartridge is suspended from the base module. The invention is applicable to other filter applications, configurations and orientations. In a preferred form, the module 10 is substantially manufactured from molded components composed of plastic, glass-filled nylon or the like. One preferred composition material is 33% glass-filled nylon.

Figure 1:
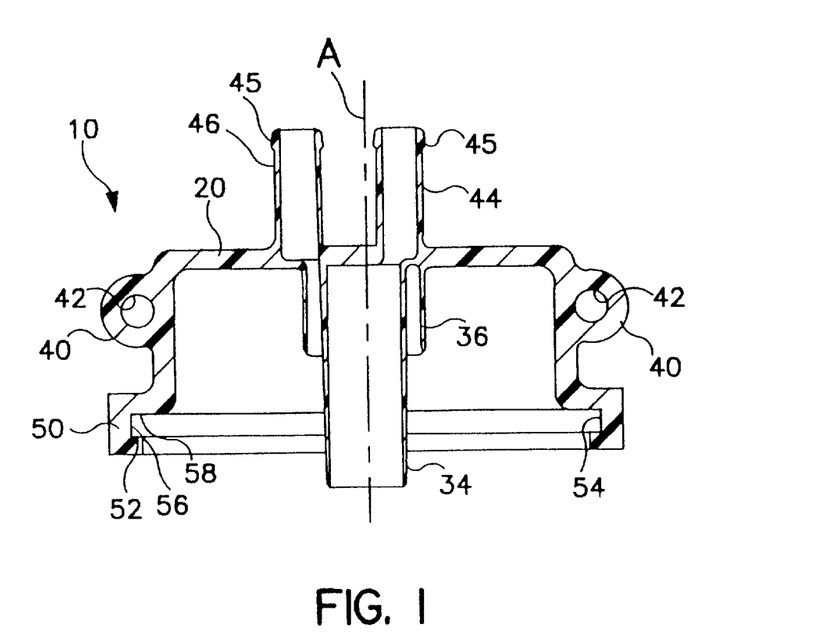
FIG. 1 is a central sectional view of a base module in accordance with the present invention.
Figure 3:
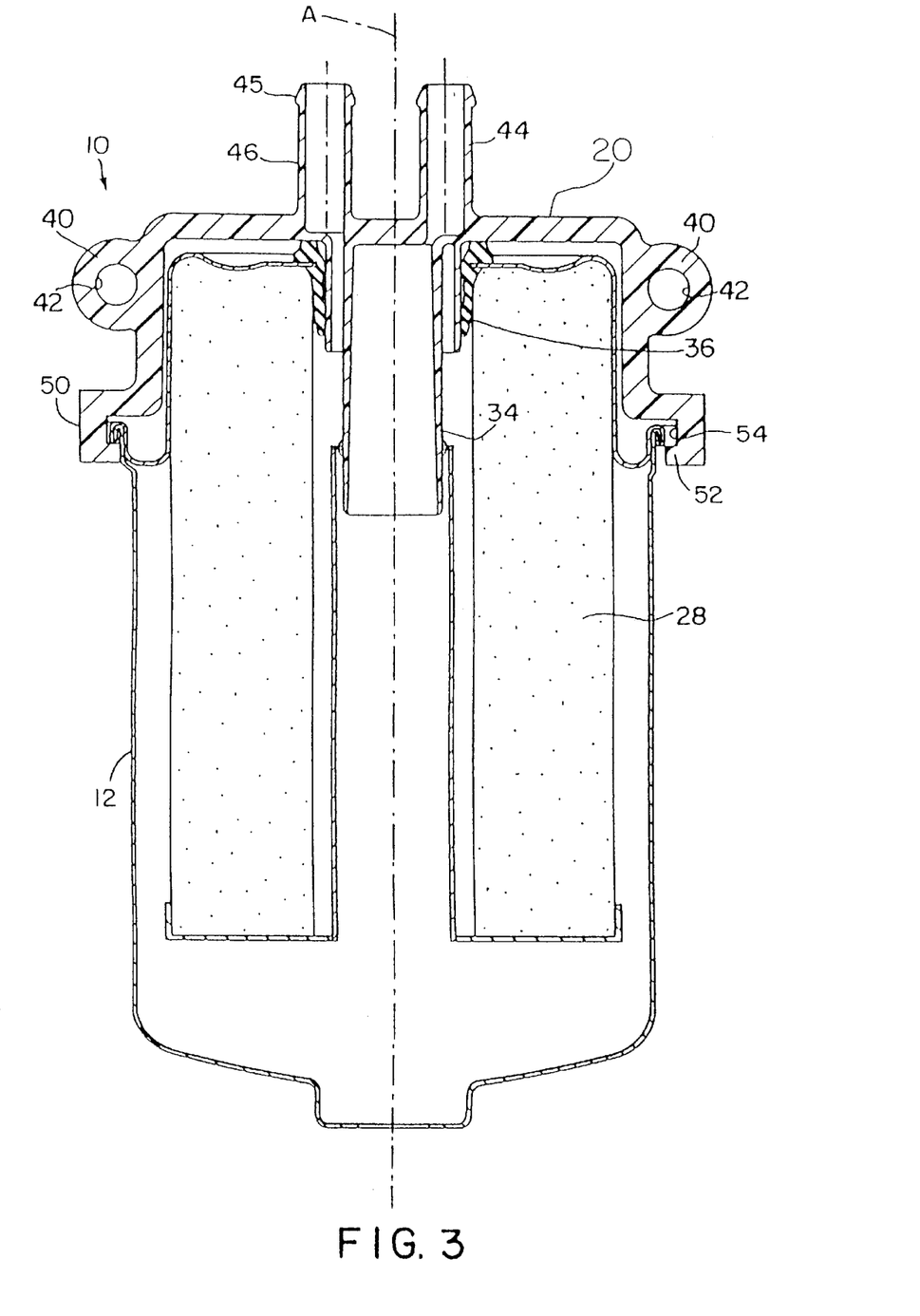
FIG. 3 is a central elevational sectional view, partly in diagrammatic form, of a fuel filter assembly comprising a base module of the present invention and a compatible fuel filter cartridge.

With reference to FIGS. 1 and 3, the base module comprises a header portion 20 that forms a receiving cavity for receiving the communication end of a filter cartridge 12. In the illustrated embodiment, the cartridge 12 is a single stage filter employing a pleated fan-shaped filter element 28. The central portion of the module includes integral inlet conduit and outlet conduits 34, 36. The conduits 34, 36 are nested sleeve-like structures. In a preferred configuration, the inlet conduit 34 axially extends a greater length than conduit 36 so that the flow path through the filter cartridge 12 is axially centrally and outwardly and the flow path through the filter element 28 is radially from the outer to the central interior and then generally axially through the outlet conduit 36. Alternative flow paths are also possible.

Inlet and outlet connectors 44, 46 are integrally molded to extend away from the conduits 34, 36 and to provide communication with the inlet and outlet conduits, respectively. The inlet and outlet connectors 44, 46 are configured with circular ridge surfaces 45 to facilitate the retention of various line fittings (not illustrated).

The base module 10 preferably includes one or more integral brackets 40. Each bracket may include an opening or bore 42 for receiving a fastener (not illustrated) to facilitate mounting of the module to the vehicle. It should be appreciated that alternative bracket and mounting configurations may be suitably employed.

Figure 2:
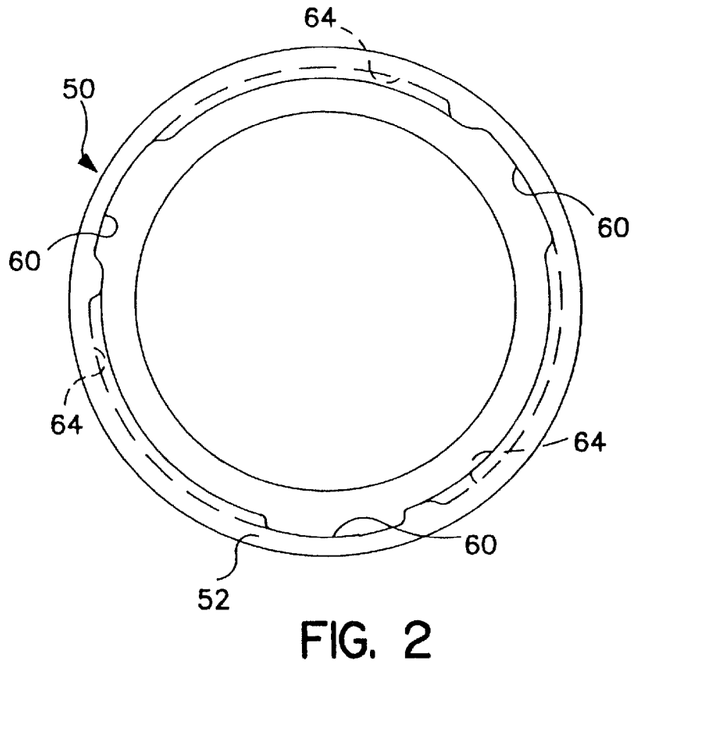
FIG. 2 is a bottom plan view, partly in phantom and portions removed, of the base module of FIG. 1.

The outer (lower) end of the receptacle integrally flares to form a retainer 50 for securing the cartridge to the base in a stable installed position and facilitating the reception thereof. The retainer 50 axially terminates in an inward facing circumferential channel 54 defined by a shoulder 58, side wall 56 and a retainer lip 52. The retainer lip 52 preferably defines a plurality of angularly spaced axial slots 60 as best illustrated in FIG. 2. The slots 60 mate with corresponding radially protruding tabs 70 (FIGS. 6 and 7) of the cartridge to facilitate axial reception upon angular alignment thereof and insertion into the receiving cavity. The cartridge is then rotated so that the tabs 70 are retained at seats 64 (FIGS. 2, 5).

Figure 6:
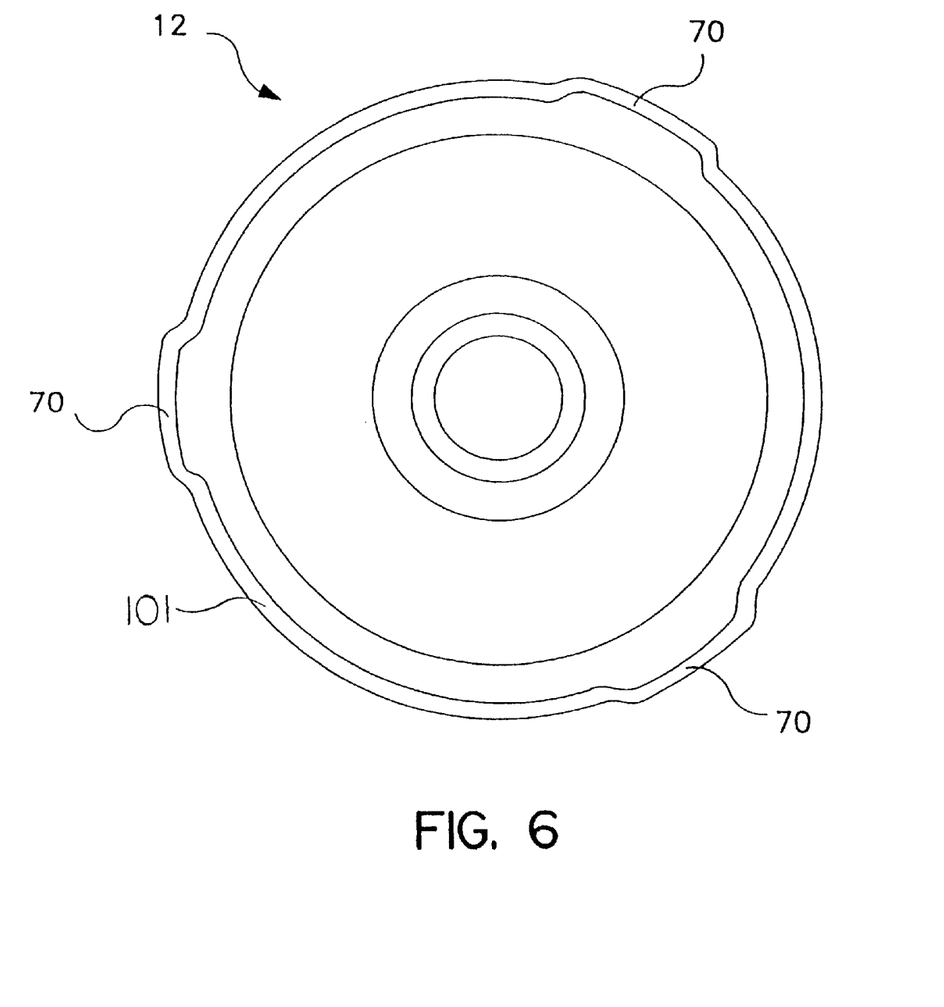
FIG. 6 is a top plan view of a cartridge of FIG. 3.
Figure 7:
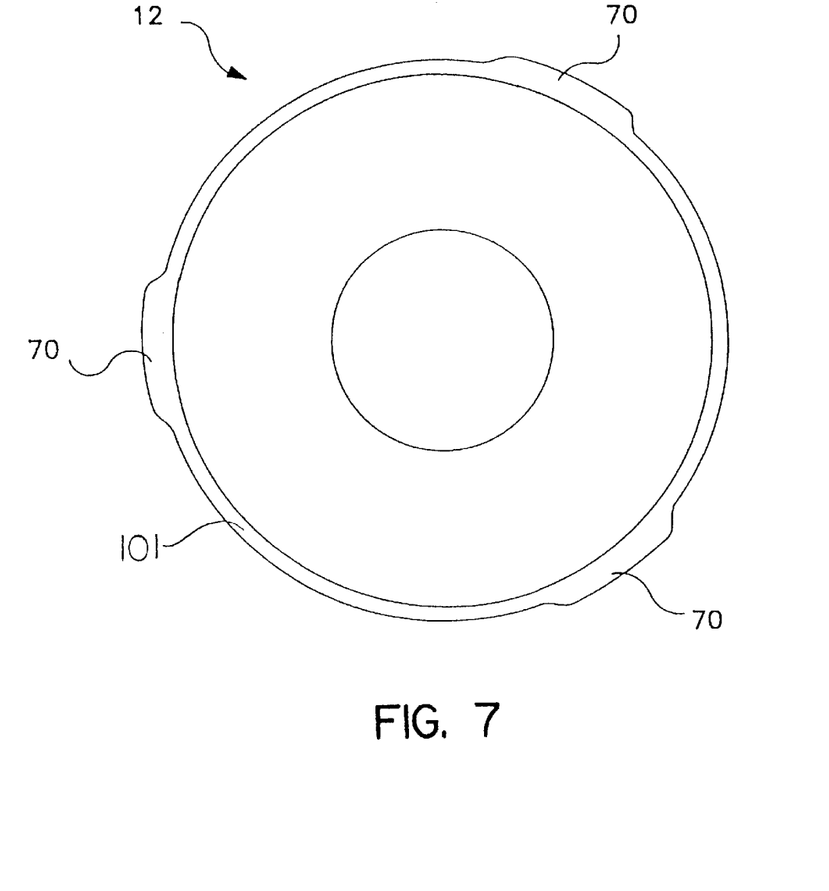
FIG. 7 is a bottom plan view of the cartridge of FIG. 3.

FIGS. 6 and 7 illustrate possible alternative configurations for the tabs 70. In FIG. 6, the roll seam 101 is bent radially outwardly to form the tabs 70. In FIG. 7, the roll seam 101 is flattened axially to form the tabs 70. Depending on the material and configuration of the filter cartridge, the tabs may be formed using a variety of material forming methods.

Figure 5:
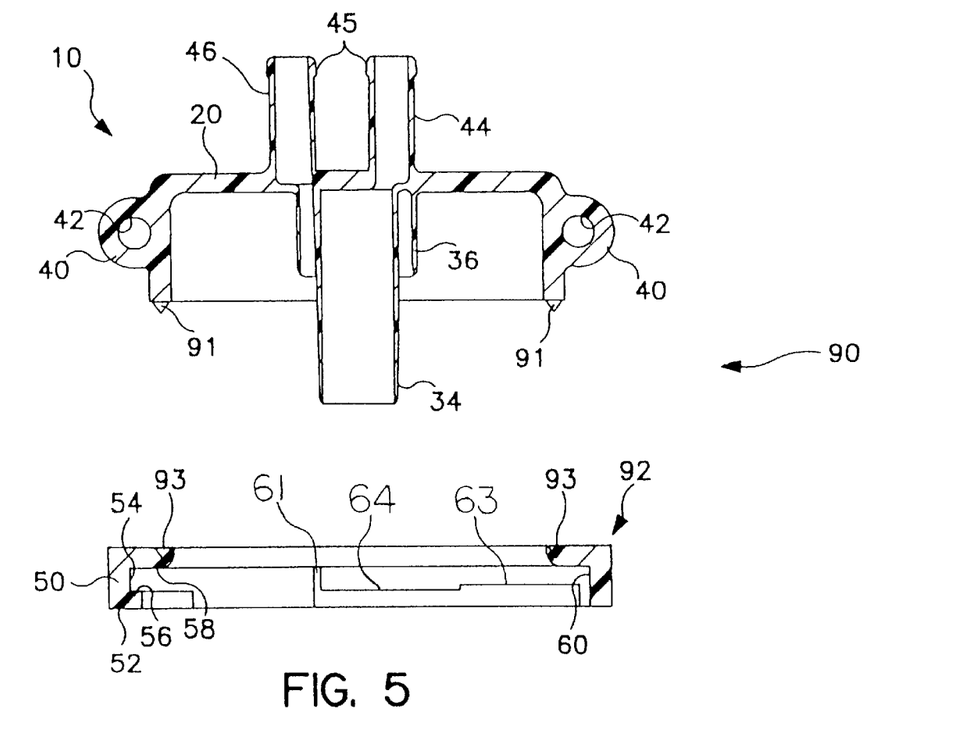
FIG. 5 is a central sectional view illustrating two pre-assembly components for the base module of FIG. 1.

FIG. 5 illustrates an alternative configuration for the retainer 50. In this alternative configuration the retaining channel is divided into a series of retaining channel portions by angularly spaced stops 61. Each retaining channel portion includes a seat 64 and an adjacent raised portion 63. The tabs of a received cartridge pass over the raised portions 63 during rotation. A spring bias between the cartridge 12 and the base module 10 biases the tabs 70 into the seats 64. In one embodiment, the end of the sealing grommet 26 of the cartridge may provide the requisite spring bias. A releasable locking retention is thus accomplished without a separate retaining collar or retaining ring and in some embodiments without an additional spring component.

Figure 4:
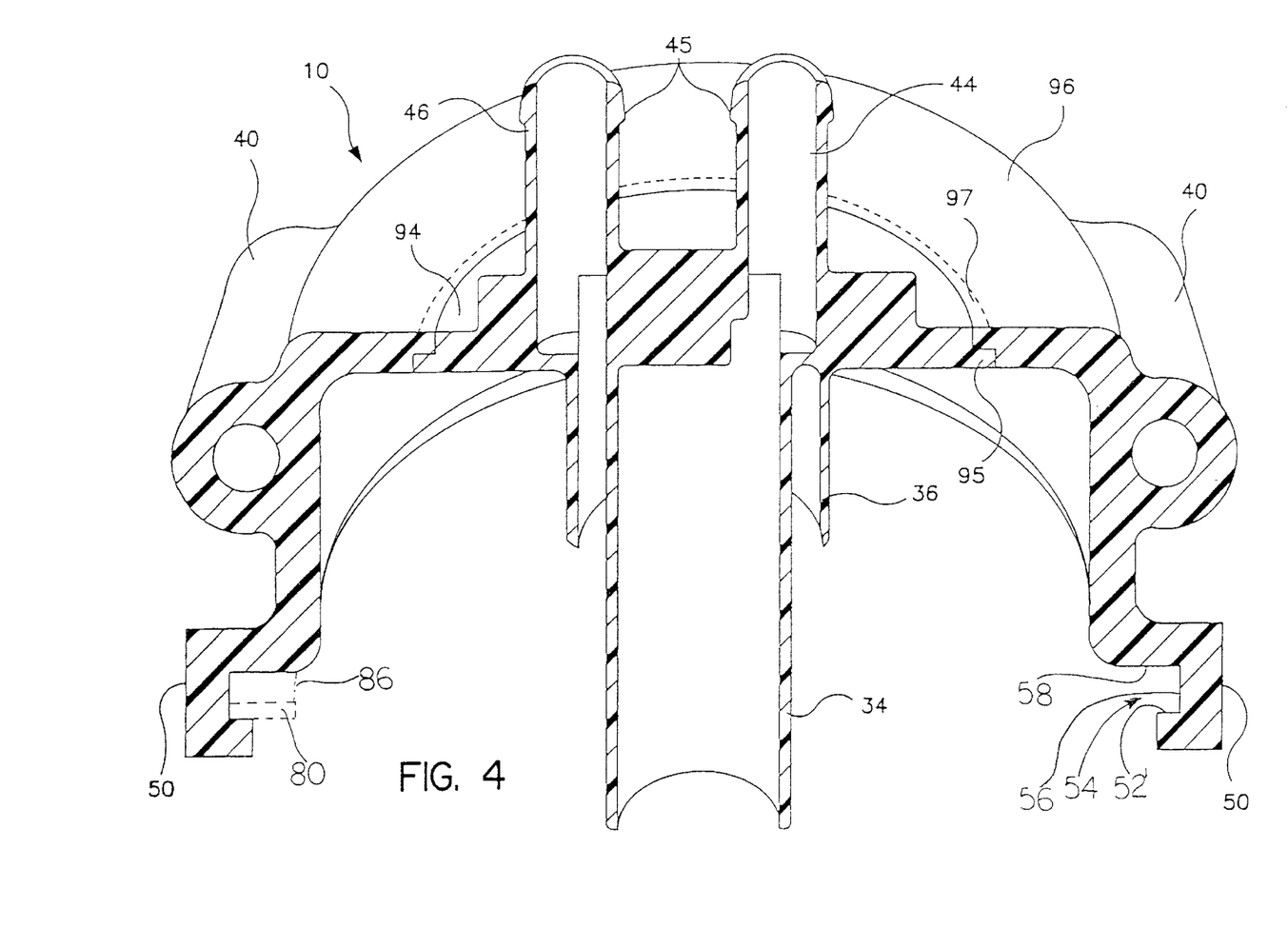
FIG. 4 is an enlarged fragmentary perspective view, partly in phantom and partly in diagrammatic form, of the base module of FIG. 1 illustrating a half section thereof.
Figure 8:
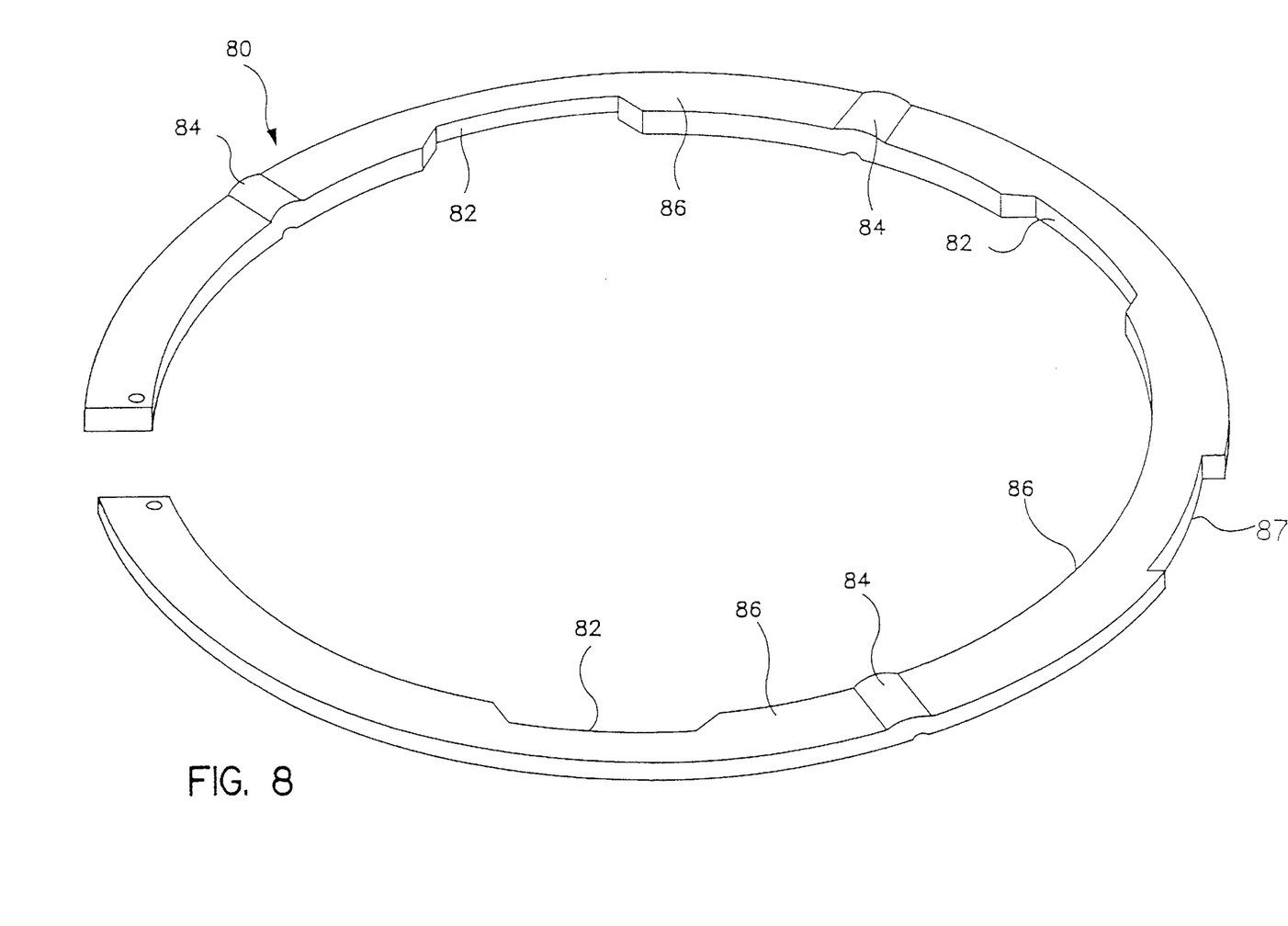
FIG. 8 is a perspective view of a plate that may be inserted into the base module of FIG. 1.

With reference to FIGS. 4 and 8, in one embodiment the retaining lip 52' is augmented by a stamped plate in the form of a split ring 80. The split ring 80 includes preformed axial slots 82 and retaining bumps 84. A compressed split ring 80 is inserted into the retaining channel 54 of the retainer 50 and expands in place. A notch 87 in the radially outer edge of the split ring 80 aligns with a complementary projection (not shown) in the circumferential channel 54 to retain the split ring 80 in a generally fixed rotational position relative to the base module. The split ring may be glued in place against the side wall 56 and retaining lip 52'. The split ring 80 defines a metal retaining lip 86 that projects radially inwardly of the radially shortened retaining lip 52' of the base module. It should be understood that the configuration of the metal retaining lip 86 can be easily changed by inserting a different split ring 80.

The stamped plate 80 aligns with and/or defines the axial slots 60 of the retaining lip. The cartridge is secured in the installed position by axially inserting the tabs through the slots and rotating the cartridge so that the tabs 70 ride over the retaining bumps 84. A biasing means functions to bias the cartridge toward the metal retaining lip 86 defined by the split ring 80. The cartridge is held in a generally fixed axial and rotational position with respect to the base module until a sufficiently robust axial and rotational force is applied.

With reference to FIG. 5, the base module 10 is preferably a molded structure which, in one embodiment, is formed from a pair of molded components that are sonically welded to form an integral base module. As illustrated by the pre-assembly components of FIG. 5, the receptacle portion 90 may be molded separately from the retainer structure 92, and then the two components are welded or joined together. An annular tongue 91 and groove 93 may facilitate the bond.

With reference to FIG. 4, the base module 10 may be formed from a pair of radially central and radially outer pre-assembly components 94 and 96. The components 94 and 96 include a pair of locking rings 95 and 97 that are sonically welded to form the integral structure. This generic base module is completed by fixing a split ring 80 in the retaining channel 54 to equip the base module 10 with a metal retainer lip 86 having a particular configuration of axial slots 82 and retainer bumps 84.

It will be appreciated that the foregoing base module 10 provides a module which does not require a separate retaining ring structure for securing the cartridge into position. Moreover, the module 10 may be formed using a relatively efficient and low cost manufacturing method, i.e., by molding the principal components and joining the components by sonic welding, adhesives or other well known techniques to form the integral molded structure.

Figure 9:
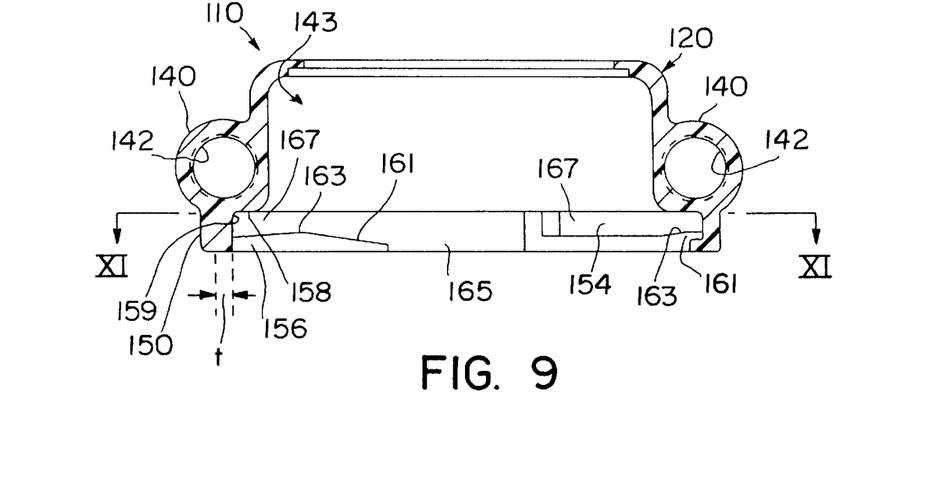
FIG. 9 is a partial central sectional view of a base module in accordance with another embodiment of the present invention.
Figure 10:
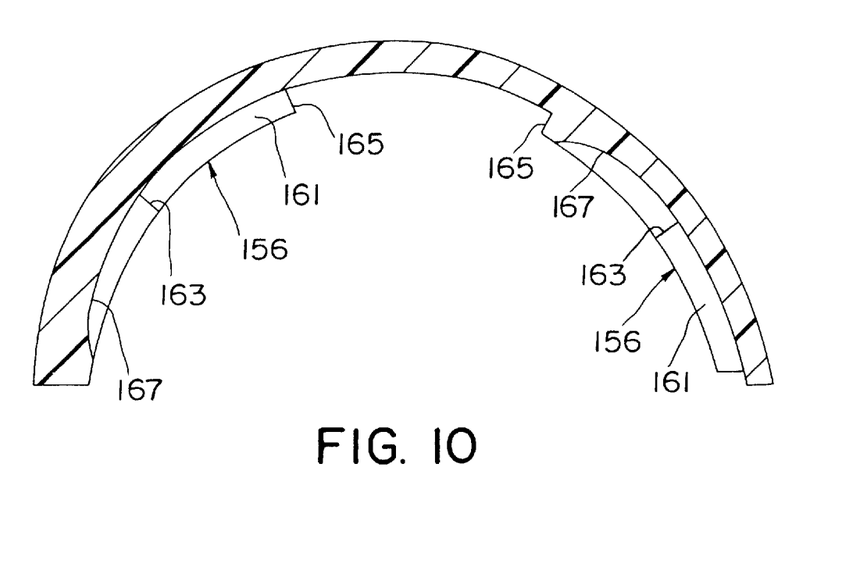
FIG. 10 is a cross sectional view taken along line Xl of FIG. 9.

Referring now to FIGS. 9 and 10, another embodiment of a base module is shown generally at 110. It will be understood that while the base module 110 is illustrated without inlet and outlet conduits such as those discussed above and illustrated in FIG. 1, any suitable inlet and outlet device for communicating with a cartridge (discussed below) may be employed therewith.

Similar to the base module 10, alternative base module 110 includes a header 120 which may be composed of any suitably strong and durable material such as a nylon and which is preferably molded as discussed above. Brackets 140 are provided which may be integrally molded with the header 120 and each comprise a bore 142. The header 120 defines a receiving cavity 143 that axially terminates in a retainer 150. The retainer 150 includes a retaining channel 154 defined by a retaining lip 156 and a shoulder 158 which are connected by a side wall 159. The retaining lip 156 includes an inclined portion 161 that extends from a pinch crest 163 to an axial slot 165. The axial slots 165 are dimensioned to receive a tab 170 of a cartridge 112 which is discussed in more detail below. The side wall 159 includes a plurality of ramp-like projections 167 which extend inwardly in the radial direction illustrated by thickness "T".

Figure 11:
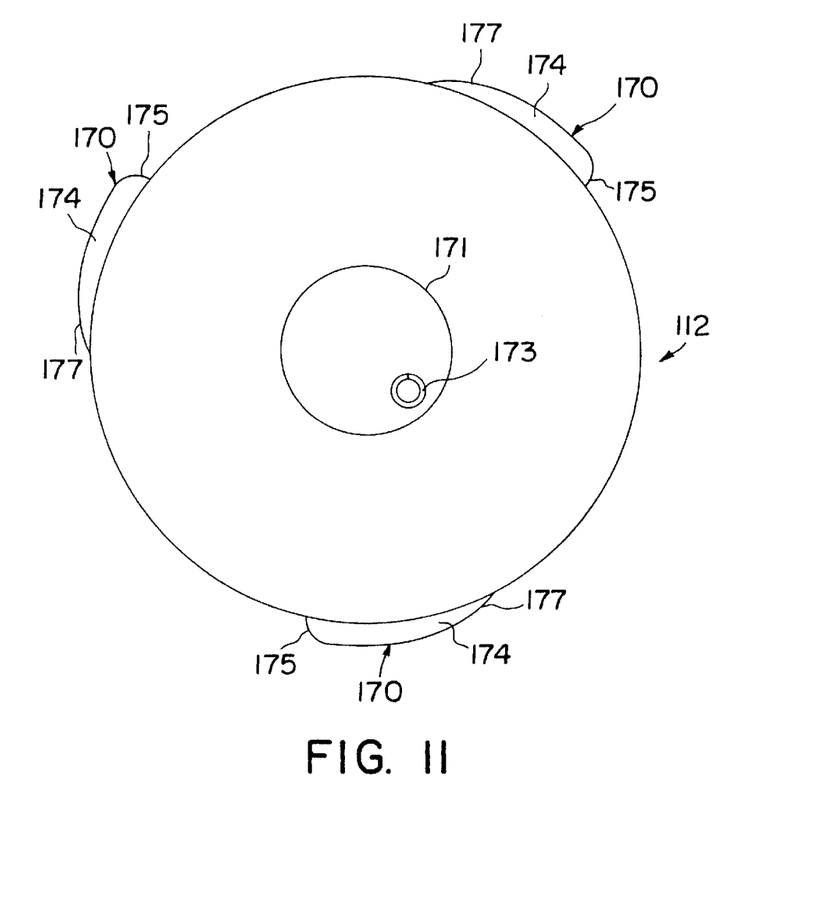
FIG. 11 is a bottom plan view of a cartridge complementing the base module of FIG. 9.

Referring now also to FIG. 11, the cartridge 112 may be similar to that discussed above in connection with FIG. 3 and may include a filter element, a drain valve operator 171 and drain pipe 173. The drain valve operator 171 and drain pipe 173 are provided for water removal or draining the cartridge prior to replacement.

As illustrated, the cartridge 112 includes tabs 170 that have outer surfaces including a face 174, rounded ends 175 and a leading edge 177 configured to complement the ramp-like projections 167 of the retainer ring 150.

Figure 12:
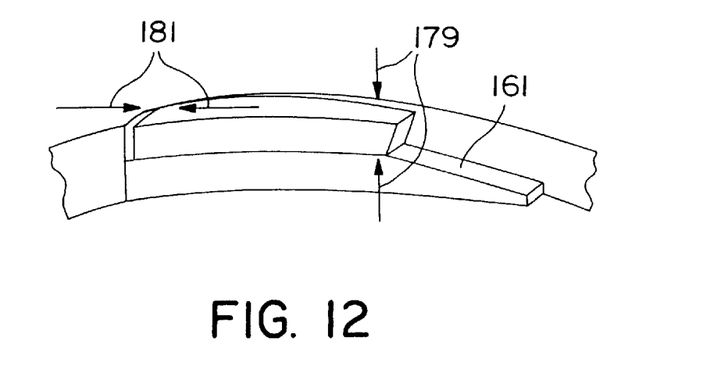
FIG. 12 is a partial perspective view, partly broken away, illustrating a tab from the cartridge of FIG. 11 in functional conjunction with a portion of the retaining channel of the base module of FIG. 9.

Turning now also to FIG. 12, during assembly of the cartridge 112 to the base module 110, the cartridge is oriented so that each of the tabs 170 pass through axial slots 165 when the cartridge is inserted into the receiving cavity 143. Thereafter, the cartridge 112 may be rotated whereby each tab 170 slides along inclined portion 161 and past a pinch crest 163 of the retaining lip 156. In this way, each pinch crest 163 will pin a tab 170 against a shoulder 158 (which is not shown in FIG. 12 for clarity) thereby reducing the likelihood of inadvertent movement of cartridge 112. In addition, the leading edges 177 of each tab 170 will engage the ramp-like projections 167 to provide further frictional engagement between the cartridge 112 and the base module 110.

Arrows 179 and 181 illustrate how the ramp-like projections 167 engage the tabs 170 in a direction which is perpendicular to that of the pinch crest 163. In essence, the contact between the tabs 170, ramp-like projections 167, pinch crest 163 and shoulder 158 results in enhanced frictional engagement between the cartridge 112 and the base module 110. In this manner, the cartridge 112 is captured in place in a manner that prevents possible inadvertent disassembly because of engine or road vibration. Accordingly, as used herein the term "enhanced frictional engagement" contemplates a configuration of the retainer 150 and/or the tabs 170 which results in engagement in two or more directions which is sufficient to prevent inadvertent movement of the cartridge 12.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the appended claims.

What is claimed is:

1. A base module for receiving a cartridge having a plurality of angularly spaced radially projecting tabs having engagement surfaces, the base module comprising:

a header portion having a central axis and defining a generally cylindrical receiving cavity symmetrical about said axis; and a retainer integrally extending from said header portion and including an inward retaining channel generally coaxial with said axis and being defined by a retaining lip and an axially spaced shoulder connected by a side wall, the retaining lip defining a plurality of angularly spaced axial slots, wherein said retainer lip comprises a split ring affixed in said retaining channel, and the cartridge is mountable to the base module upon axially inserting the tabs through the slots and rotating the cartridge.

2. The base module of claim 1, wherein said axial slots are equiangularly spaced.

3. The base module of claim 1, wherein the angular spacing between at least two of said axial slots is not equal to the angular spacing between another two of said axial slots.

4. The base module of claim 1, wherein said base module is formed from a plastic material.

5. The base module of claim 1, wherein said base module is formed from a glass-filled nylon material.

6. The base module of claim 1, wherein said split ring includes an upper surface facing said header portion and at least one retainer bump projecting from said upper surface, said at least one retainer bump angularly spaced from at least one axial slot.

7. The base module of claim 1, wherein said retainer lip includes a seat and an angularly adjacent raised portion associated with each said axial slot, said raised portion disposed between each said axial slot and each said seat.

8. The base module of claim 7, wherein said retaining channel is divided into a series of angularly spaced retaining channel portions by angularly spaced stops disposed between each retaining channel portion, each said axial slot having an associated retaining channel portion in communication therewith and including a said seat and a said raised portion.

9. A filter assembly comprising:
a base module for a filter assembly comprising:
a header portion having a central axis and defining a generally cylindrical receiving cavity symmetrical about said axis, the header portion providing for fluid communication between a fluid system and the receiving cavity and including bracket means for mounting the base module to a mounting structure;
a retainer integrally extending from said header portion and including an inward retaining channel generally coaxial with said axis and being defined by a retaining lip and shoulder connected by a side wall, the retainer lip comprising a split ring affixed in said retaining channel, said retainer lip defining a plurality of angularly spaced axial slots; and
a cartridge comprising a complementary plurality of radially projecting tabs arranged and configured to pass axially through said axial slots and be received in said retaining channel upon rotation of said cartridge,
wherein said tabs are frictionally engaged by said retaining lip,
whereby said cartridge is retained in a generally fixed axial and rotational relationship to said base module.

10. The filter assembly of claim 9, wherein said axial slots are equiangularly spaced.

11. The filter assembly of claim 9, wherein the angular spacing between at least two of said axial slots is not equal to the angular spacing between another two of said axial slots.

12. The filter assembly of claim 9, wherein said base module is formed from a plastic material.

13. The filter assembly of claim 9, wherein said base module is formed from a glass-filled nylon material.

14. The base module of claim 9, wherein said split ring includes an upper surface facing said header portion and at least one retainer bump projecting from said upper surface, said at least one retainer bump angularly spaced from at least one axial slot.

15. The base module of claim 9, wherein said retainer lip includes a seat and an angularly adjacent raised portion associated with each said axial slot, said raised portion disposed between each said axial slot and each said seat.

16. The base module of claim 14, wherein said retaining channel is divided into a series of angularly spaced retaining channel portions by angularly spaced stops disposed between each retaining channel portion, each said axial slot having an associated retaining channel portion in communication therewith and including a said seat and a said raised portion.

17. The filter assembly of claim 9, wherein said base module is a unitary molded member.

* * * * *